ated May 29, 1956

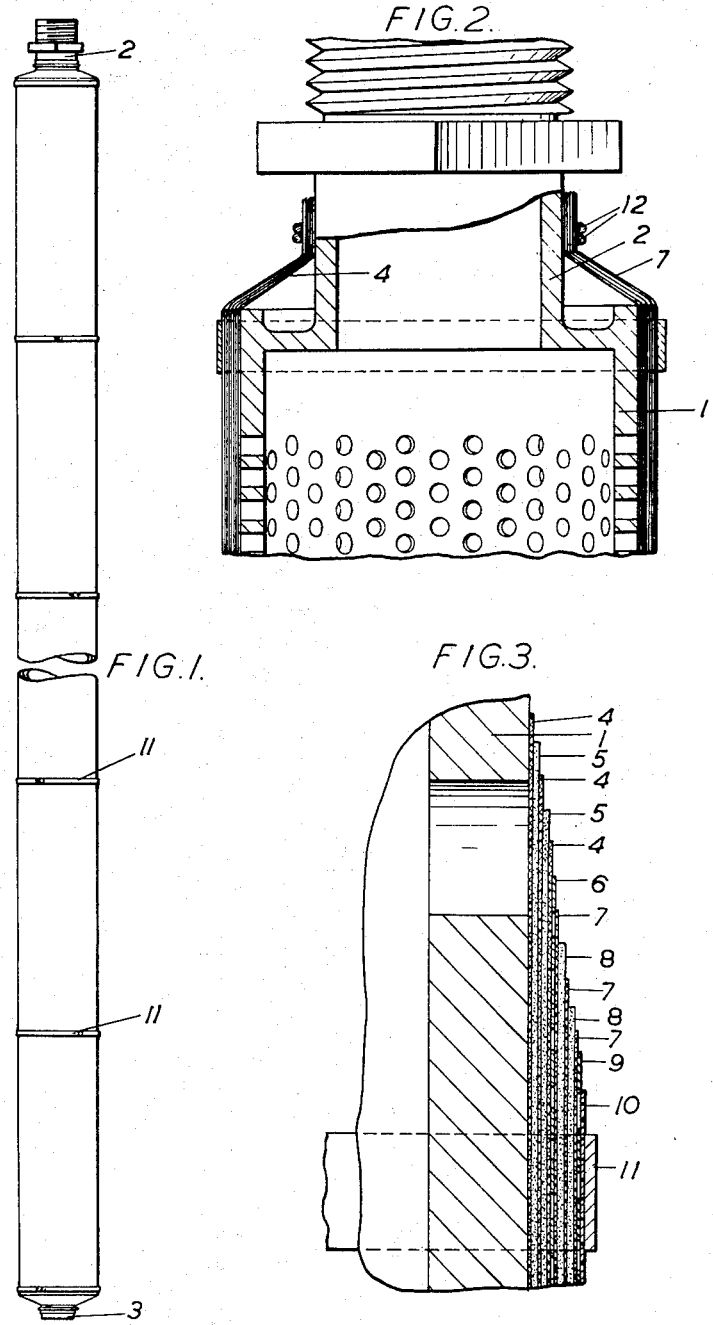

2,747,686

FILTER

Harry L. Riley and John Norris, Treeton, near Rotherham, England, assignors to United Coke & Chemicals Company Limited, Treeton, near Rotherham, England Application December 8, 1952, Serial No. 324,768

Claims priority, application Great Britain December 17, 1951

7 Claims. (Cl. 183—69)

This invention relates to filters.

In chemical processes in which use is made of catalyst particles in a fluidised state to catalyse a gaseous reaction it is necessary to remove catalyst particles from the stream of gases flowing from the reaction vessel so as to prevent their loss. The gases must therefore be passed through a filter. The conditions may be extremely severe. For instance, it may be necessary to separate catalyst particles smaller than 300 mesh size from a gas stream at about 400° C. or more. Now it is found in practice that none of the existing forms of filter is suitable. The catalyst particles build up as a cake on the surface of the filter and must periodically be removed by blowing back. Unless the filter is blown back very frequently, the resistance to flow may be equivalent to a back pressure of from 1 to 30 lbs. per square inch. The pressure across the filter may therefore be high, and the filter must be robust. If a rigid filter of porous metal or ceramic material is used, the cake of catalyst particles tends to adhere to the surface instead of being detached when blown back. If it is not detached, then the effective area of the filter is reduced until in the course of time it becomes necessary to stop the whole process to allow the filter to be cleaned. In many catalytic reactions such complete stoppage of the process may involve an expensive plant being out of action for a week or so. Moreover, a ceramic or stainless steel filter is easily damaged, and then it must be wholly replaced at considerable expense. There is a demand for a filter capable of operating satisfactorily under the conditions set forth and of being easily and quickly repaired if it should be accidentally damaged.

Our principal object is to provide a filter satisfying all the requirements set forth above.

Another object of the invention is to provide a filter having a filter medium which will yield readily to detach the filter cake when blown back.

A further object is to provide a filter capable of withstanding high temperatures and yet simple to make.

The invention is based on the use of fibrous glass, which per se is known as a filtering medium. To appreciate the nature of the invention, the difference between various kinds of fibrous glass must be clearly understood.

Glass fibres are commonly produced by feeding molten glass through nozzles or the like to produce filaments. If yarn is required, the process is carried on either to produce so-called continuous filament yarn, which is a smooth silky material, or staple yarn, which is much thicker and relatively rough and hairy.

Continuous filament fabric is woven from continuous filament yarn and is a thin material presenting numerous unfilled interstices. Staple cloth is woven from staple yarn, and is much thicker than continuous filament fabric. Glass wool or felt consists of glass fibre in bulk, either uncompressed in the case of wool or somewhat compressed and matted in the case of felt, and in either case is a rough and hairy mass.

The improved filter of this invention, suitable for use under the conditions set forth, comprises a hollow rigid frame having one end open for the passage of gas and a flexible wrapping around the frame. The wrapping is composed of glass or like fibres in the form of wool, felt or staple cloth held in position by glass or like tape.

The reason for using staple cloth, wool or felt is that each of these materials is bulky, and in staple cloth any interstices between the individual yarns are filled by projecting ends of the fibres fraying or spreading out from the yarn. These materials are thus different in character from continuous filament fabric and act as filters in a way that continuous filament fabric cannot do.

When staple cloth is used, a length of it may be wound as three or four turns around the frame and bound by glass tape. When, as is preferred, glass wool or felt is used it is desirable to enclose it within layers of glass or like fabric woven from continuous filament yarn.

The use of glass tape is important because it does not make the structures rigid, i. e. it allows the desired movement on blow-back, and yet it has high tensile strength. Metal wire, on the other hand, tends to cut through any of the glass materials in question if it is put under adequate tension to hold them firmly in place. Moreover, any metal reduces the area available for the passage of gas, whereas glass tape is itself a filtering medium, so its use does not involve any reduction in the total filter area.

The preferred construction according to the invention is shown in the accompanying drawings, in which:

Figure 1 is an elevation of a filter, Figure 2 is a longitudinal section through the upper portion of the filter shown in Figure 1 and Figure 3 is a fragmentary longitudinal section through one of the filters on a much larger scale.

The filter shown is one of a large number provided in parallel to receive the gases leaving a reaction vessel in which phthalic anhydride is formed in the vapour phase with the use of very fine particles of vanadium pentoxide catalyst. The filters may conveniently be mounted vertically in collector boxes at the top of the reaction vessel.

Each filter comprises a cylindrical frame 1 of a metal, e. g. steel, resistant to the gases to be filtered, the frame having a spigot at each end. The spigot 2 at the upper end is connected to the collector box, and the spigot 3 at the lower end is closed. The body of the frame 1 is a perforated tube, the perforations being round holes 3/16 inch in diameter with their centres 1/4 inch apart vertically. The tube is encased by a number of successive cylindrical layers. First there are alternating layers of glass fabric 4 woven from continuous filament yarn and glass felt 5, namely three of fabric and two of felt, and these are held by an open-wound helix of glass tape 6. Then there is a second series of alternating layers of fabric 7 and felt 8, namely three of fabric and two of felt, and these are held by two further helices of glass tape 9 and 10, the helix 9 being open-wound and the helix 10 being closely wound so that adjacent turns abut against one another. Finally metal bands 11 are put round the wrapping and held by clips.

All the layers of glass fabric are long enough to extend over both the spigots 2 and 3, the fabric layers being tied in position by glass cord 12 so as to safeguard against leakage developing at either end between the frame and the fabric as a result of accidental loss of tension in the metal band.

In operation the gases flow radially inwards through the wrapping and frame and leave the filter through the open spigot 2. Thus the filter cake builds up on the outside of the filter, and when it is to be detached the filter is blown back by forcing gas radially outwards from the interior. On blow-back there is slight movement of the layers forming the wrapping, this movement materially assisting in detaching the filter cake.

The filter shown is highly satisfactory in practice. It is robust for the reasons that it is based on a metal frame with relatively small holes, the fabric and felt are interlayered and bound by glass tape, and the whole wrapping is held by the metal bands. At the same time it is flexible and will yield slightly on blow-back. This slight movement is of very great importance in the detaching of filter cake. If filter cake is allowed to accumulate there is a danger that the cake may initiate exothermic reaction on the filter with a consequent danger of rapid and excessive increase in temperature. This could be so rapid and violent as to result in the destruction of the filter. The importance of ensuring that filter cake is detached on blow-back cannot be over-emphasised.

In stead of glass fibres we may use slag wool or silica fibres or vitreous aluminum silicate, both for the fabric and the felt. Any of these fibres may be used at temperatures up to 450° C., whereas other mineral fibres, e. g. asbestos, become dehydrated and brittle even at lower temperatures.

Finally, if it is necessary to replace a filter the steel frame can be easily and cheaply re-wrapped.

We claim:

1. A filter for collecting catalyst particles to be blown back into a reaction vessel comprising a hollow rigid frame and a flexible wrapping around the frame, said wrapping comprising alternate layers of glass fabric and glass felt, glass tape being wound around said layers whereby the wrapping will yield slightly on block-back to detach the caked catalyst particles.

2. A filter according to claim 1 in which said wrapping is further held in position by encircling metal bands.

3. A filter for collecting particles of a catalyst used in a gaseous reaction wherein the collected particles are periodically blown back into a reaction vessel comprising a perforated metal tube having one end thereof open, a flexible wrapping around the tube, said wrapping comprising a series of layers of glass fabric and glass felt, glass tape helically wound around said wrapping whereby the wrapping will yield slightly on blow-back to detach the collected catalyst particles and glass cord tied around the ends of said wrapping to retain the same on the perforated tube.

4. A filter according to claim 3 in which said wrapping is further held in position by encircling metal bands.

5. A filter for collecting catalyst particles to be blown back into a reaction vessel comprising a hollow rigid frame and a flexible wrapping around the frame, said wrapping comprising a plurality of discrete layers of a silica-containing fibrous material and said layers of material being held in position by a tape of continuous filament silica-containing yarn whereby the wrapping will yield slightly on blow-back.

6. A filter according to claim 5 wherein said fibrous material comprises a woven mass.

7. A filter according to claim 5 wherein said fibrous material comprises a non-woven mass.

References Cited in the file of this patent

UNITED STATES PATENTS

| | | |
|---|---|---|
| 232,122 | Hammesfahr | Sept. 14, 1880 |
| 1,229,437 | Foster | June 12, 1917 |
| 2,137,246 | Myers | Nov. 22, 1938 |
| 2,350,011 | Black | May 30, 1944 |
| 2,429,751 | Gohr | Oct. 28, 1947 |
| 2,459,398 | Walters | Jan. 18, 1949 |

FOREIGN PATENTS

| | | |
|---|---|---|
| 451,520 | Italy | Sept. 20, 1949 |